United States Patent
Suzuki

(10) Patent No.: US 7,313,969 B2
(45) Date of Patent: Jan. 1, 2008

(54) PRESSURE SENSOR

(75) Inventor: Kazushi Suzuki, Chiryu (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/207,901

(22) Filed: Aug. 22, 2005

(65) Prior Publication Data

US 2006/0053896 A1 Mar. 16, 2006

(30) Foreign Application Priority Data

Sep. 13, 2004 (JP) ............... 2004-264919

(51) Int. Cl.
*G01L 7/00* (2006.01)
(52) U.S. Cl. ...................................... 73/756
(58) Field of Classification Search ............ 73/717, 73/723, 756
See application file for complete search history.

(56) References Cited

U.S. PATENT DOCUMENTS

| | | | |
|---|---|---|---|
| 4,809,555 A * | 3/1989 | Kunz | ........................ 73/727 |
| 5,499,535 A * | 3/1996 | Amano et al. | ................ 73/717 |
| 5,503,034 A * | 4/1996 | Amano et al. | ......... 73/862.473 |
| 2006/0053896 A1 | 3/2006 | Suzuki | |

FOREIGN PATENT DOCUMENTS

| | | |
|---|---|---|
| EP | 0 995 979 A1 | 4/2000 |
| EP | 1 116 943 A2 | 7/2001 |
| JP | 2004-37318 | 2/2004 |

OTHER PUBLICATIONS

U.S. Appl. No. 11/342,535, filed Jan. 31, 2006, Suzuki et al.

* cited by examiner

*Primary Examiner*—Andre J. Allen
(74) *Attorney, Agent, or Firm*—Oblon, Spivak, McClelland, Maier & Neustadt, P.C.

(57) ABSTRACT

In a pressure sensor which has a metal housing 12 containing a sensor chip 11 and a joint housing 14 and in which an insulating member 15 is arranged to electrically insulate both of the metal housing 12 and the joint housing 14 from each other, the metal housing 12 is connected to a stable potential such as, for example, a sensor power supply or a sensor ground. Thus, there can be solved a problem that the detection signal is liable to be influenced by electric noise from outside where a signal line of the pressure sensor and the sensor housing are electrically suspended or unfixed.

3 Claims, 1 Drawing Sheet

PRESSURE SENSOR

Figure 1:
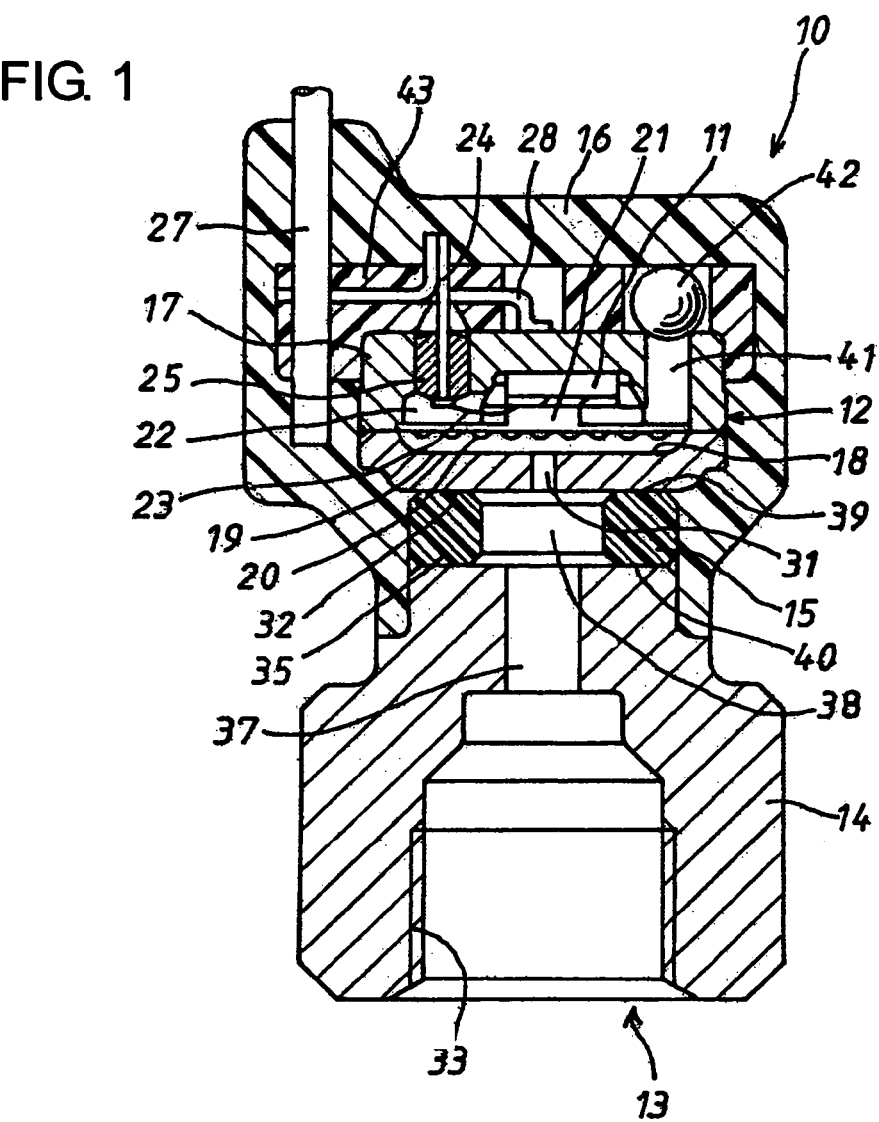

This application is based on and claims priority under 35 U.S.C. 119 with respect to Japanese Application No. 2004-264919 filed on Sep. 13, 2004.

BACKGROUND OF THE INVENTION

1. Field of the Invention

The present invention relates to a pressure sensor for measuring a pressure by a sensor chip responsive to the pressure.

2. Discussion of the Related Art

Heretofore, in pressure sensors of an oil filled type having a metal diaphragm, one described for example in the following patent document 1 has been known, wherein an insulating member made of alumina-based ceramics is provided between a joint housing made of a copper-base alloy having a mounting section onto a pressure measured device and a sensor housing made of stainless steel for electrically insulating the joint housing and the sensor housing from each other.

[Patent Document 1]: Japanese Unexamined, Published Patent Application No. 2004-37318 (Paras. 0015 and 0030, FIGS. 1 and 2)

The prior art pressure sensor as aforementioned is accompanied by the problem that it is liable to suffer the influence of electrical noise from outside since a signal line of the pressure sensor and the sensor housing are electrically suspended or unfixed.

SUMMARY OF THE INVENTION

Accordingly, it is a primary object of the present invention to provide an improved pressure sensor which does not suffer the influence of electrical noise from outside and hence, is excel in an anti-noise capability.

Briefly, according to the present invention, there is provided a pressure sensor comprising a metal housing incorporating a sensor chip responsive to the pressure in a pressure chamber, a joint housing having a mounting section onto a pressure measured device, and an insulating member provided between the joint housing and the metal housing for electrically isolating the joint housing and the metal housing from each other, wherein the metal housing is electrically connected to a place having a stable electric potential.

With this construction, since the metal housing covering the sensor chip is electrically connected to the stable electric potential, it can be realized to shield the sensor chip electrically. Thus, there can be advantageously obtained a pressure sensor which does not suffer the influence of electrical noise from outside and hence, is excel in an anti-noise capability.

BRIEF DESCRIPTION OF THE ACCOMPANYING DRAWINGS

Figure 2:
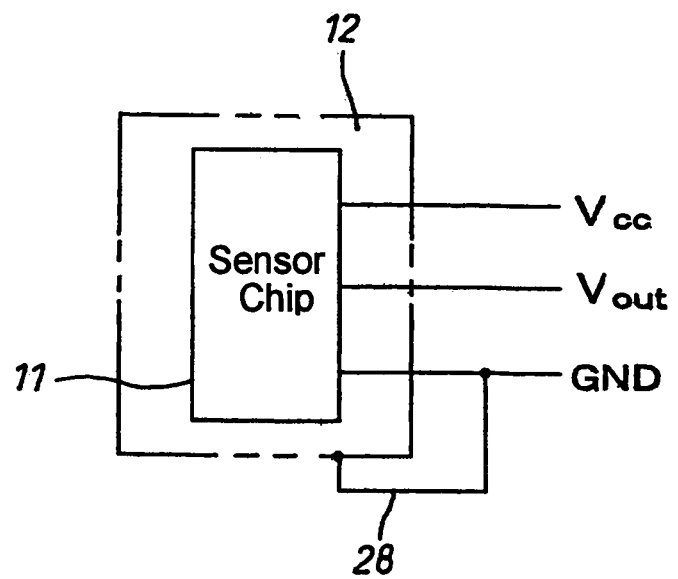

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 1 is a sectional view of a pressure sensor in one embodiment according to the present invention; and FIG. 2 is a circuit diagram showing terminals including one connected to a sensor chip of the pressure sensor.

DETAILED DESCRIPTION OF THE PREFERRED EMBODIMENT

Hereafter, a pressure sensor 10 in one embodiment according to the present invention will be described with reference to the accompanying drawings.

As shown in FIG. 1, the pressure sensor 10 in the embodiment is composed primarily of a metal housing 12 incorporating a sensor chip 11 therein, a joint housing 14 having a mounting section 13 onto a pressure measured device (not shown), an insulating member 15 arranged between the joint housing 14 and the metal housing 12, and a resin mold 16 which is formed by molding an insulating quality resin to completely cover the metal housing 12 and the insulating member 15 and to partly cover the joint housing 14.

The metal housing 12 comprises a stem 17 made of metal and arranging the sensor chip 11 at the center portion thereof and a sensor housing 19 made of stainless steel and bodily joined with the stem 17 with a storage space 18 therebetween. The storage space 18 defines a pressure chamber 21 at one end side of the stem 17 having the sensor chip 11 arranged therein. The pressure chamber 21 is tightly closed with a metal diaphragm 20 which is supported to be sandwiched between the stem 17 and the sensor housing 19. Silicon oil 22 as pressure conveyance medium is fluid-tightly filled in the pressure chamber 21. The pressure chamber 21 is isolated from fluid which is the pressure measured object and is constructed so that the sensor chip 11 is able to detect the pressure of the fluid acting on the metal diaphragm 20, through the silicon oil 22 fluid-tightly filled in the pressure chamber 21.

The pressure chamber 21 receives therein the sensor chip 11 having a silicon diaphragm (not shown) sensitive to pressure and also having terminal pins 24 electrically connected thereto by means of bonding wires 23. The sensor chip 11 is bonded onto the stem 17, and the terminal pins 24 protrude their respective one ends into the pressure chamber 21 through the stem 17. The terminal pin 24 are sealed and isolated by, e.g., a glass-base sealing material 25 from the stem 17, so that the silicon oil 22 is prevented from leaking through a clearance which may otherwise be formed between the terminal pins 24 and the stem 17 unless such a sealing material 25 is provided.

The aforementioned terminal pins 24 are composed of three pins for power supply, signal output and ground. These terminal pins 24 pass through the sealing material 25 deposited in the stem 17 and are led outside the pressure sensor 10 through a harness 27 which is provided in the resin mold 16 by insert molding. As shown in FIG. 2, the terminal pin 24 for power supply is connected to a power supply terminal Vcc, the terminal pin 24 for signal output is connected to a signal output terminal Vout, and the terminal 24 for ground is connected to a ground terminal GND.

The terminal pin 24 for ground has a lead 28 connected electrically thereto, and one end of the lead 28 is connected by resistance welding to the upper end of the stem 17 constituting the metal housing 12. Thus, the electric potential of the metal housing 12 covering the sensor chip 11 can be compulsorily set to have the same electric potential as the ground of the sensor chip 11. In this way, the sensor chip 11 is electrically shielded to diminish the influence exerted by electric noise.

The metal diaphragm 20 supported to be sandwiched between the stem 17 and the sensor housing 19 is firmly fixed by laser welding between the stem 17 and the sensor housing 19. The sensor housing 19 has a pressure leading hole 31 for leading the fluid as the pressure measured object to the backside of the metal diaphragm 20 and also has an attaching surface 32 for soldering the insulating member 15, on a surface side where it abuts on the insulating member 15.

The joint housing 14 is a joint member which is made of a copper-based alloy (e.g., brass) for attaching the pressure sensor 10 to a conduit pipe or the like which fluid-tightly contains the fluid as measured object. The joint housing 14 takes a generally cylindrical shape and is provided at its one end in the axial direction with a mounting section 13, whose internal surface has a threaded portion 33 formed for being mounted on the conduit pipe or the like.

An attaching surface 35 for attaching the insulating member 15 thereon is provided on a surface abutting on the insulating member 15 of the joint housing 14. Pressure leading holes 37 and 38 for leading the fluid as pressure measured object are formed in the joint housing 14 and the insulating member 15 and are in fluid communication with the backside surface of the metal diaphragm 20 through the pressure leading hole 31 of the sensor housing 19.

The insulating member 15 is made of alumina-based ceramics and has an electrically insulating quality. The insulating member 15 takes a ring shape which has formed at its center portion the pressure leading hole 38 for allowing the fluid as pressure measured object to pass through.

A film which is made by metalizing molybdenum-manganese and then by further depositing nickel by plating is formed on each of abutting surfaces 39 and 40 being the opposite surfaces of the insulating member 15. The films on the abutting surfaces 39, 40 are formed electrically independently of each other so that no electric contact is made between the both films. Then, the insulating member 15 and the sensor housing 19 are joined with each other by joining one abutting surface 39 of the insulating member 15 with the attaching surface 32 being an end surface of the sensor housing 19 by silver soldering. Similarly, the insulating member 15 and the sensor housing 19 are joined with each other by joining the other abutting surface 40 of the insulating member 15 with the attaching surface 35 being an end surface of the joint housing 14 by silver soldering.

The resin mold 16 covering the metal housing 12 and the insulating member 15 is made of a resin of electrically insulating quality, makes the metal housing 12 waterproof, and has the harness 27 embedded therein by insert molding.

The stem 17 is formed with an oil filling passage 41, whose one end opens to the pressure chamber 21 at an off-center position of the stem 17, and the other end of the oil filling passage 41 opens to the top surface of the stem 17. Filling the silicon oil 22 from the oil filling passage 41 is performed after the pressure chamber 21 is defined between the stem 17 and the metal diaphragm 20 upon completion of the sub-assembly of the metal housing 12. That is, the completion of the sub-assembly of the metal housing 12 makes the pressure chamber 21 formed between the stem 17 and the metal diaphragm 20, in which state the pressure chamber 21 is made to be vacuum, and the silicon oil 22 is filled from the oil filling passage 41 under the vacuum atmosphere. After the filling of the silicon oil 22, the open end of the oil filling passage 41 is closed by means of a seal ball 42 to make the pressure chamber 21 closed fluid-tightly. The seal ball 42 is fixed by resistance welding to the stem 17 after the fluid-tight closing of the pressure chamber 21.

In FIG. 1, a numeral 43 denotes a resin-made cable holder covering the upper half of the stem 17, and the terminal pins 24 and the leads 28 are contained in the cable holder 43 by insert molding.

In pressure measurement with the pressure sensor 10 of the aforementioned construction, the pressure sensor 10 is attached at the threaded portion 33 of the joint housing 14 to a conduit pipe or the like which fluid-tightly contains fluid being the pressure measured object. Thus, the fluid being the pressure measured object is led to the backside of the metal diaphragm 20 through pressure lead holes 37, 38 and 31 formed respectively in the joint housing 14, the insulating member 15 and the sensor housing 19. Thus, the pressure of the fluid being the pressure measured object acts on the metal diaphragm 20 and is conveyed to the sensor chip 11 by way of the silicon oil 22 which is tightly filled as pressure conveyance medium in the pressure chamber 21. The sensor chip 11 transforms the pressure applied thereto into a corresponding electric signal, which is taken out through the bonding wires 23 and the terminal pins 24.

At this time, since the metal housing 12 containing the sensor chip 11 is connected to the sensor ground terminal GND, the sensor chip 11 is electrically shielded, whereby it becomes hard to be influenced by the electric noise given from outside.

Although the foregoing embodiment describes the example wherein the stem 17 constituting the metal housing 12 is connected to the sensor ground terminal GND, the connection portion to which the stem 17 is connected for electric shielding is not limited to the sensor ground terminal GND and may be a place having a stable potential such as, e.g., the sensor power supply terminal Vcc. Further, the same effect can be attained where the stem 17 is connected to another power supply terminal different from the sensor power supply terminal Vcc.

Where the stem 17 is connected to, e.g., the sensor ground terminal GND, both of them can be connected by making the terminal pin 24 for ground pass directly through a hole formed in the stem 17 without through the sealing material 25 and by joining the terminal pin 24 for ground with the stem 17.

Further, the foregoing embodiment describes the example wherein the metal housing 12 and the insulating member 15 are covered with the resin mold 16. The resin mold 16 is effective to protect the metal housing 12 against water or the like, but is not necessarily required in practicing the present invention.

Various features and many of the attendant advantages in the foregoing embodiment will be summarized as follows:

In the pressure sensor 10 in the embodiment shown in FIG. 1, since the metal housing 12 covering the sensor chip 11 is electrically connected to the stable potential, the sensor chip 11 can be shielded electrically. Thus, there can be advantageously obtained a pressure sensor 10 which does not suffer the influence of the electrical noise from outside and hence, is excel in an anti-noise capability.

Also in the pressure sensor 10 in the embodiment shown in FIG. 1, since the metal housing 12 covering the sensor chip 11 can be connected to the sensor ground GND by utilizing the already existing terminal pin or the like, the function of electrically shielding the sensor chip 11 can advantageously attained by a very simple means.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressure sensor comprising:
a metal housing incorporating a sensor chip responsive to the pressure in a pressure chamber;
a joint housing having a mounting section onto a pressure measured device; and
an insulating member provided between the joint housing and the metal housing for electrically isolating the same from each other;
wherein the metal housing is electrically connected to a place having a stable potential.

2. The pressure sensor as set forth in claim 1, wherein the metal housing comprises:
a stem containing the sensor chip therein; and
a sensor housing bodily connected to the stem with a metal diaphragm supported to be sandwiched between itself and the stem; and
wherein the stem and the metal diaphragm define a pressure chamber in which a pressure conveyance medium is filled fluid-tightly.

3. The pressure sensor as set forth in claim 1, wherein the place having the metal housing connected thereto and having the stable potential is either of a sensor power supply and a sensor ground.

* * * * *